3,299,746
MULTIPLE SPEED RATIO POWER TRANSMISSION MECHANISM WITH LOCKUP CLUTCH
Eugene Walter Konrad, Northville, Mich., assignor to Ford Motor Company, Dearborn, Mich., a corporation of Delaware
Filed Aug. 5, 1963, Ser. No. 299,777
6 Claims. (Cl. 74—758)

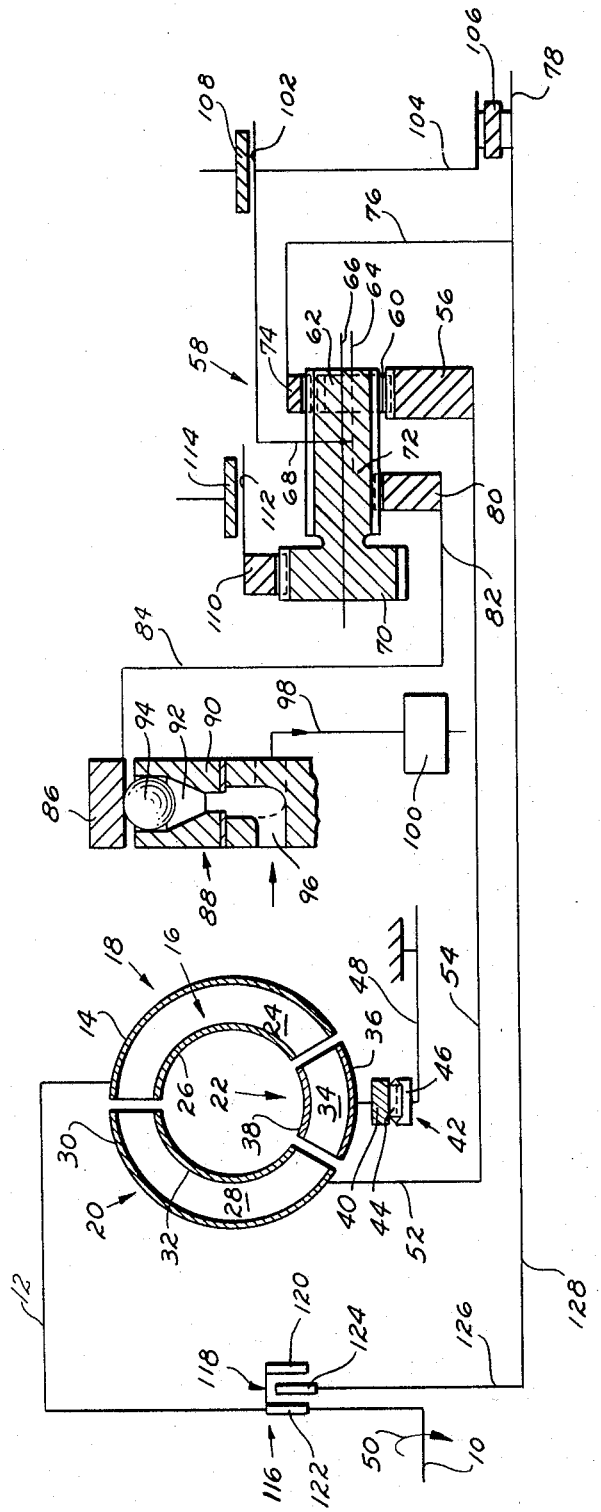

This invention relates to a transmission, and more particularly to an automatic transmission construction preferably for use in a motor vehicle.

In general, most commercial passenger car-type motor vehicle transmissions, whether automatic or nonautomatic, supply power to a rear axle assembly having a gear ratio step down generally between 3 or 4 to 1 in order to obtain the greatest efficiency of operation and the best overall fuel economy.

To obtain greater fuel economy, these transmissions are frequently combined with a two-speed overdrive gear unit to obtain the same output shaft speed at lower engine speeds. This additional transmission unit, however, adds considerably to the cost of the entire power package, and increases the maintainance. Furthermore, the shifts in the overdrive unit generally must be initiated by, and/or are noticeable to the driver, which is undesirable.

Also, a large majority of commercial automatic transmissions have a hydrodynamic drive device, such as a hydraulic torque converter, for example, ahead of the gearset not only to eliminate the use of a manually operated engine clutch, but also provide initial torque multiplication. This results in a combined hydraulic mechanical drive to the output shaft and rear axles at all times. Power losses due to slip in the hydrodynamic drive are therefore inherent at all speeds. In installations where the automatic transmission is connected directly to the rear axle differential assembly instead of through an overdrive unit, if the rear axle numerical ratio is reduced to simulate an overdrive installation, the resultant lower speeds of operation of the hydrodynamic unit for the same output shaft speeds results in very inefficient operation due to the higher slip losses.

One of the objects of the invention, therefore, is to provide a transmission construction that is automatic in operation, and provides drive ratios that simulate or are equivalent to those provided now only by the inclusion of an additional overdrive unit.

It is a further object of the invention to provide an automatic transmission that has infinitely smooth shifts between the different speed ratios or drive ranges.

It is also an object of the invention to provide an automatic transmission having a direct mechanical drive for its high speed range, thereby eliminating the fluid losses inherent in a hydraulic-mechanical drive of the type described above.

The invention provides an automatic transmission construction satisfying the above requirements. It has power input and output shafts connected by a hydraulic torque converter and a compound planetary gearset serially connected to a low numerical ratio axle. The gearset has a number of sun and ring gears meshing with intermeshed planet pinions, one of which is of a stepped construction. The gearset also has a number of selectively engageable brake members for holding different gearset reaction members stationary at different times to condition the gearset for a number of forward and reverse reduction drives. The transmission includes a hydrodynamic fluid brake, the controlled selective operation of which provides infinitely smooth shifts between drive ranges. A direct drive clutch between the power input and output shafts is also provided for bypassing both the torque converter and gearset to establish a high range, pure mechanical drive from the power input shaft to the rear axles.

It will be seen, therefore, that the invention provides a three-speed automatic transmission that provides simulated overdrive speed ratios, has infinitely smooth shifts, and a direct mechanical drive. The invention therefore provides a transmission that is simple in construction, economical to manufacture, and efficient in operation. The use of a single gearset combined with a hydrostatically braked reaction member and other selectively operable brakes, a hydraulic torque converter, a direct drive clutch and a low numerical ratio axle, provides all of the advantages now obtainable generally only by a three-speed automatic transmission having a conventional axle ratio and modified by the addition of a two-speed overdrive gear unit.

Other objects, features and advantages of the invention will become apparent upon reference to the succeeding detailed description thereof, and to the drawing illustrating the preferred embodiment thereof; wherein, the figure shows, schematically, a cross-sectional view of one-half of an automatic transmission embodying the invention.

The figure shows a power input shaft 10 that is driven by any suitable source of power (not shown) such as, for example, the internal compustion engine for a motor vehicle. The shaft is drivingly connected by an annular shell 12 to the outer annular shroud 14 of a fluid impeller or pump 16. The pump constitutes one portion of a known type of hydraulic torque converter 18 having a turbine 20 and a stator or reaction member 22. The pump has a number of circumferentially spaced blades 24, substantially dish-shaped in cross section, secured between the outer shroud 14 and an inner annular shroud 26. The impeller blades face a number of turbine blades 28, mounted between outer and inner annular shrouds 30 and 32. The stator member 22 is positioned between the fluid outlet of the turbine and the inlet to the impeller, and consists of a number of blades 34 located between outer and inner annular shrouds 36 and 38.

The outer and inner shrouds of each of the members together define a toroidal path for the counterclockwise circulation of fluid from the pump to the turbine and back again through the stator in a known manner. Initially, the unit causes torque to be multiplied, and subsequently, it acts as a fluid clutch. For this purpose, the hub of the stator is connected to the outer annular race 40 of a one-way overrunning coupling or brake 42. The brake is of a known type having circumferentially spaced sprags or rollers 44 separating the outer race from an inner annular race 46. The inner race is secured by a sleeve shaft 48 to a stationary portion of the transmission housing. The one-way brake operates in a known manner, the sprags tilting, or rollers wedging, between the inner and outer races to prevent rotation of the stator 22 in a counterclockwise or reverse direction, while moving to an unlocking or unwedging position upon clockwise rotation of the stator in the direction of the arrow 50.

The turbine is drivingly connected by a radial flange 52 to one end of an intermediate power input shaft 54. The opposite end of this shaft has secured to it a sun gear 56 of a gearset 58. The gearset is of the compound planetary type having a number of spaced sets of intermeshed planet pinion gears 60 and 62 rotatably mounted upon planet pinion shafts 64 and 66 secured in a common rotatable carrier 68. The idler pinion 60 is meshed with sun gear 56 and with the primary pinion 62.

Pinion 62 is of the stepped type having gear portions 70 and 72 of different diameters. The smaller diametered portion 72 is constantly in engagement with an annulus or ring gear 74 connected by a member 76 to the transmission power output shaft 78. Portion 70 also has meshing with it a second sun gear 80 secured by a sleeve shaft 82 and a connector 84 to the rotatable cam drive element 86 of a hydrostatic fluid brake 88. Sun gear 80 constitutes a reaction member for the gearset to provide one reduction drive therethrough, and is adapted to be braked by the selective operation of the hydrostatic brake 88.

Brake 88 is shown as being of a ball piston type hydrostatic pumping unit. It consists of a stationary cylinder block 90 having spaced bores 92 containing a number of circumferentially spaced ball piston members 94. The ball members cooperate with the eccentrically-shaped rotatable stroking ring or cam 86. The pump operates in a known manner, rotation of the ring 86 permitting the progressive movement of one-half of the ball valve members 94 outwardly by centrifugal force while the other half of the ball members are being forced inwardly by the ring. The fluid, accordingly, is drawn from a sump (not shown) into an inlet line 96, through the pump and out an outlet line 98.

In this particular instance, the outlet line 98 is provided with a control valve unit illustrated schematically by the block 100 that progressively controls the discharge of fluid through the outlet. The valve in unit 100 may be of any suitable type providing a progressive restriction, such as, for example, a needle type valve, not shown. The valve would be operated by means controlled by a fluid pressure control system providing for the automatic operation of the transmission.

It will be clear that blocking of the fluid outlet of pump 88 will prevent relative rotation between the stationary cylinder block and the stroking ring 86 connected to sun gear 80, thereby establishing the sun gear as a reaction member for the gearset. In this particular instance, the braking of sun gear 80 is used to establish an intermediate speed drive through the transmission, which will be explained in more detail later.

The carrier 68 also can be braked to provide a different forward reduction drive, that is, low or first speed, in this case. For this purpose, the carrier is connected to a member having a drum-like flange 102 and a radial flange 104 journaled at 106 on a stationary portion of the transmission. The outer peripheral portion of the flange 102 is formed with a suitable friction surface for cooperation with an annular brake band 108. This band is of the fluid pressure actuated type, and is selectively engaged when conditions so indicate the need to brake the rotation of carrier 68.

The larger diameter portion 70 of step pinion 62 meshes with a second annulus or ring gear 110 having a drum-like extension 112. A second selectively engaged fluid pressure actuated brake band 114 is provided for engagement with the surface of drum 112 to establish a reverse drive, in a manner to be described.

The transmission is also provided with a selectively engageable direct drive clutch 116 between the power input and output shafts 10 and 78 to establish a pure mechanical drive, by-passing both the torque converter 18 and gearset 58. Secured to the shell 12 is an annular clutch driving member 118 having a radial disc portion 120. This portion together with a portion 122 of the shell, are provided with suitable friction surfaces for cooperation with friction material 124 secured to the outer portions of an annular driven friction disc 126. The hub of disc 126 is secured to the forward end 128 of the power output shaft 78.

Clutch 116, like brakes 108 and 114, may be of the fluid pressure actuated type, and is selectively engaged to mechanically connect the shafts 10 and 78.

In operation, a Neutral condition of the transmission is established by disengaging clutch 116, brakes 108 and 114, and moving the valve in unit 100 to completely unblock the outlet 98 of pump 88. Under these circumstances, there is no reaction member for the gearset since all gear members except ring gear 74 are free to rotate. Rotation of sun gear 56 by turbine 20 from input shaft 10 and impeller 16 therefore merely planetates the gear 62 within ring gear 74.

First or low speed forward drive is established from a neutral position by applying brake band 108 to hold carrier 68 stationary. Subsequent forward or clockwise rotation of shaft 10 in the direction of the arrow 50 rotates pump 16 and turbine 20 forwardly to drive sun gear 56 in the same direction. The reverse rotation of stator 22 is prevented by engagement of the one-way brake 42. The clockwise rotation of sun gear 56 causes a reverse rotation of idler gear 60 and a forward or clockwise rotation of stepped pinion gear 62 about the stationary carrier 68. Ring gear 74 and output shaft 78 are therefore driven in clockwise direction and at a reduced speed from that of input shaft 10.

Second or intermediate forward speed is obtained by disengaging brake 108 and causing the valve in unit 100 to be moved to block the outlet 98 of pump 88. This causes the pump to lock up and hold sun gear 80 stationary. Subsequent clockwise rotation of sun gear 56 by turbine 20 causes the pinion 62 to walk around the stationary sun gear 80. The carrier 68 and ring gear 74 are then driven in the same direction, driving output shaft 78 clockwise and at a speed greater than that during low speed drive.

It should be noted that the release of brake 108 and engagement of brake 88 to change from first to second speed drive will be accomplished in a timed relationship to each other. Also, as stated previously, the valve in unit 100 will be progressively moved so as to provide infinitely variable braking of the sun gear 80. This provides an infinitely smooth shaft from first to second speed drive. Conversely, the infinitely variable release of brake 88 and application of band 108 provides an infinitely smooth shift from second to first speed.

A direct mechanical drive is established by moving the valve in unit 100 to completely unblock the outlet 98 of pump 88, thereby releasing the sun gear 80 for rotation. The engagement of clutch 116 then directly connects input shaft 10 and output shaft 78 for a one-to-one drive therebetween. As in the case of the shift from first to second speed drive, the valve unit 100 will cause the progressive unblocking of the outlet 98 in timed relation to the engagement of clutch 116 to provide an infinitely smooth shift between intermediate and high speed drive.

A reverse drive is obtained by engaging brake band 114 to hold ring gear 110 stationary, and disengaging band 108 and brake 88. Subsequent forward rotation of sun gear 56 by turbine 20 causes counterclockwise rotation of pinion 60, and clockwise rotation of pinion 62. With ring gear 110 stationary, pinion 62 is forced to walk around within the ring gear in a reverse or counterclockwise direction, driving ring gear 74 in the same direction. Output shaft 78 is therefore driven in a reverse or counterclockwise direction, and at a speed as determined by the compound reduction through the gearset.

As stated previously, the construction provides a transmission, which, when combined with a low numerical ratio axle, simulates a transmission provided with an additional overdrive unit. For example, using illustrative figures of say, 33 teeth for sun gear 56, 40 teeth for sun gear 80, 86 teeth for ring gear 74, 101 teeth for ring gear 110, 38 teeth for portion 70 of pinion 62 and 23 teeth for portion 72, then the transmission would have a first or low speed ratio of approximately 2.61 to 1, an intermediate ratio of 1.51 to 1, and a reverse ratio of 2.93 to 1. These ratios, when combined with a low numerical ratio axle, provide output shaft speeds equivalent to that provided, for example, by known commercial transmissions having an overdrive unit and a substantially standard axle ratio.

From the foregoing, it will be seen that the invention provides a transmission having a single gearset construction, which, together with a hydraulic torque converter, provides speed ratios equivalent to that provided by known types of transmissions using additional overdrive gear units. It will also be seen that infinitely smooth shifts are provided by the use of the hydrostatic fluid reaction pump as a means for holding one of the members of the transmission stationary. It will also be seen that the transmission provides a high speed purely mechanical drive range, thereby eliminating the losses normally associated with hydrodynamically driven gearsets.

While the invention has been illustrated in its preferred embodiment in the drawing, it will be understood to those skilled in the arts to which the invention pertains, that many changes and modifications may be made thereto without departing from the scope of the invention.

I claim:

1. A transmission gear train comprising a forwardly rotating power input shaft and an output shaft, and a planetary gearset connecting said shafts providing a plurality of different drives therebetween, said gearset having a plurality of sun and ring gear members intermeshing with planet pinion gear members mounted on a rotatable carrier member and including a stepped planet pinion gear member, means connecting one of said sun gear members and said input shaft, means connecting one of said ring gear members to said output shaft, said ring gear members meshing with different stepped portions of said pinion gear, and a plurality of selectively engageable brake means for holding different ones of said members stationary at different times to provide forward and reverse drives through said gearset.

2. A transmission comprising a forwardly rotating power input shaft and an output shaft, and means including a hydrodynamic drive device and a planetary gearset connecting said shafts providing a plurality of different drives therebetween, said drive device having a plurality of rotatable members including a pump connected to said input shaft and a turbine, said gearset having a plurality of sun and ring gear members intermeshing with planet pinion gear members mounted on a rotatable carrier member and including a stepped planet pinion gear member, means connecting one of said sun gear members to said turbine, means connecting one of said ring gear members to said output shaft, said ring gear members meshing with different stepped portions of said pinion gear, and a plurality of selectively engageable brake means for holding different ones of said members stationary at different times to provide forward and reverse drives through said gearset.

3. A transmission gear train comprising a forwardly rotating power input shaft and an output shaft, and a planetary gearset connecting said shafts providing a plurality of different drives therebetween, said gearset having a plurality of sun and ring gear members intermeshing with planet pinion gear members mounted on a rotatable carrier member and including a stepped planet pinion gear member, means connecting one of said sun gear members and said input shaft, means connecting one of said ring gear members to said output shaft, said ring gear members meshing with different stepped portions of said pnion gear, and a plurality of selectively engageable brake means for holding different one of said members stationary at different times to provide forward and reverse drives through said gearset, said brake means including a hydrostatic fluid brake connected to another of said sun gear members for stopping rotation thereof, said latter brake means having a selectively controllable fluid outlet for providing smooth transitions between said forward and reverse drives upon release or engagement of said hydrostatic brake means.

4. A transmission gear train comprising a forwardly rotating power input shaft and an output shaft, and means including a hydrodynamic drive device and a planetary gearset connecting said shafts providing a plurality of different drives therebetween, said gearset having a plurality of sun and ring gear members intermeshing with planet pinion gear members mounted on a rotatable carrier member and including a stepped planet pinion gear member, said drive device having a plurality of rotatable members including a pump connected to said input shaft and a turbine connected to one of said sun gear members, means connecting one of said ring gear members to said output shaft, said ring gear members meshing with different stepped portions of said pinion gear, and a plurality of selectively engageable brake means for holding different ones of said members stationary at different times to provide forward and reverse drives through said gearset, said brake means including a hydrostatic fluid brake connected to another of said sun gear members for stopping rotation thereof, said latter brake means having a selectively controllable fluid outlet for providing smooth transitions between said forward drives.

5. A transmission gear train comprising a forwardly rotating power input shaft and an output shaft, and a planetary gearset connecting said shafts providing a plurality of different drives therebetween, said gearset having a plurality of sun and ring gear members intermeshing with planet pinion gear members mounted on a rotatable carrier member and including a stepped planet pinion gear member, means connecting one of said sun gear members and said input shaft, means connecting one of said ring gear members to said output shaft, said ring gear members meshing with different stepped portions of said pinion gear, a plurality of selectively engageable brake means for holding different ones of said members stationary at different times to provide forward and reverse reduction drives through said gearset, and selectively engageable direct drive clutch means between said shafts for bypassing said gearset, said brake means including a hydrostatic fluid brake connected to another of said sun gear members for stopping rotation thereof, said latter brake means having a selectively controllable fluid outlet for providing smooth transitions between said forward drives upon release or engagement of said hydrostatic brake means.

6. A transmission gear train comprising a forwardly rotating power input shaft and an output shaft, and means connecting said shafts including a hydrodynamic drive device and a planetary gearset for providing a plurality of different drives therebetween, said gearset having a plurality of sun and ring gear members intermeshing with planet pinion gear members mounted on a rotatable carrier member and including a stepped planet pinion gear member, said drive device having a plurality of rotatable members including a pump connected to said input shaft and a turbine connected to one of said sun gear members, means connecting one of said ring gear members to said output shaft, said ring gear members meshing with different stepped portions of said pinion gear, a plurality of selectively engageable brake means for holding different ones of said members stationary at different times to provide forward and reverse reduction drives through said gearset, and selectively engageable clutch means between said shafts for bypassing said drive device and gearset to provide a mechanical drive between said shafts, said brake means including hydrostatic fluid brake connected to another of said sun gear members for stopping rotation thereof, said latter brake means having a selectively controllable fluid outlet for providing smooth transitions between siad forward drives upon release or engagement of said hydrostatic brake means.

References Cited by the Examiner

UNITED STATES PATENTS

| | | | |
|---|---|---|---|
| 2,464,088 | 3/1949 | Jandesek | 74—732 |
| 2,629,265 | 2/1953 | Dodge | 74—645 |
| 2,874,590 | 2/1959 | Kelbel | 74—688 |
| 2,897,691 | 8/1959 | Lowe | 74—782 X |
| 2,987,943 | 6/1961 | Lemieux | 74—782 |
| 3,190,421 | 6/1965 | Schulz | 74—688 |

DAVID J. WILLIAMOWSKY, *Primary Examiner.*

J. R. BENEFIEL, *Assistant Examiner.*